US007664511B2

(12) United States Patent
Wang et al.

(10) Patent No.: US 7,664,511 B2
(45) Date of Patent: Feb. 16, 2010

(54) MOBILE LOCATION METHOD FOR WLAN-TYPE SYSTEMS

(75) Inventors: Shu-Shaw Wang, Arlington, TX (US); Marilynn P. Green, Pomona, NY (US)

(73) Assignee: Nokia Corporation, Espoo (FI)

( * ) Notice: Subject to any disclaimer, the term of this patent is extended or adjusted under 35 U.S.C. 154(b) by 600 days.

(21) Appl. No.: 11/302,311

(22) Filed: Dec. 12, 2005

(65) Prior Publication Data

US 2007/0133487 A1 Jun. 14, 2007

(51) Int. Cl.
*H04W 24/00* (2009.01)
(52) U.S. Cl. .................. 455/456.1; 455/456.2; 370/328
(58) Field of Classification Search ...... 455/456.1–457, 455/404.2, 418–420, 67.11, 67.13, 515; 370/338, 370/310, 328
See application file for complete search history.

(56) References Cited

U.S. PATENT DOCUMENTS

| | | | |
|---|---|---|---|
| 2003/0235164 A1* | 12/2003 | Rogers et al. | 370/331 |
| 2005/0113107 A1* | 5/2005 | Meunier | 455/456.1 |
| 2005/0261004 A1* | 11/2005 | Dietrich et al. | 455/456.2 |
| 2006/0087425 A1* | 4/2006 | Haeberlen et al. | 340/539.13 |
| 2007/0026870 A1* | 2/2007 | Spain et al. | 455/456.1 |
| 2007/0042716 A1* | 2/2007 | Goodall et al. | 455/67.11 |

FOREIGN PATENT DOCUMENTS

WO WO 02/054813 A1 7/2002
WO WO 2004/008795 1/2004

OTHER PUBLICATIONS

Article "Estimating Signal Strengths in the Design of an Indoor Wireless Network" by A. Hills, et al in IE Transactions on Wireless Communications vol. 3 No. 1 2004 pp. 17-19.
Article "Accepted From Open Call—Rollabout: A Wireless Design Tool" by A. Hills, et al. in IEEE Communications Magazine, Feb. 2004, pp. 132-138.
Article "Location Determination of a Mobile Device Using IEEE 802.11b Access Point Signals" by S. Saha, et al. pp. 1987-1992, IEEE 2003.
Article "Radar: An In-Building RF-Based User Location and Tracking System" by P. Bahl, et al., IEEE Infocom 2000.
Article "Stepwise Refinement Algorithms for Prediction of User Location Using Receive Signal Strength Indication WLANs" by T. Deasy, et al. pp. 116-119, IEEE 2003.

* cited by examiner

*Primary Examiner*—Kamran Afshar

(57) ABSTRACT

The present invention provides a new and unique method and apparatus for providing an estimate of a mobile location of a wireless node, point or terminal in a wireless local area network (WLAN) or other suitable network, the estimate being based on a correlation of a radio frequency (RF) signal strength measurement and a grid point in a signal strength database or radio map. The signal strength database or radio map is built using a signal strength fingerprint algorithm. The signal strength fingerprint algorithm includes selecting and measuring a set of grid points in the wireless local area network (WLAN) or other suitable network.

26 Claims, 10 Drawing Sheets

Flow diagram for estimating mobile location.

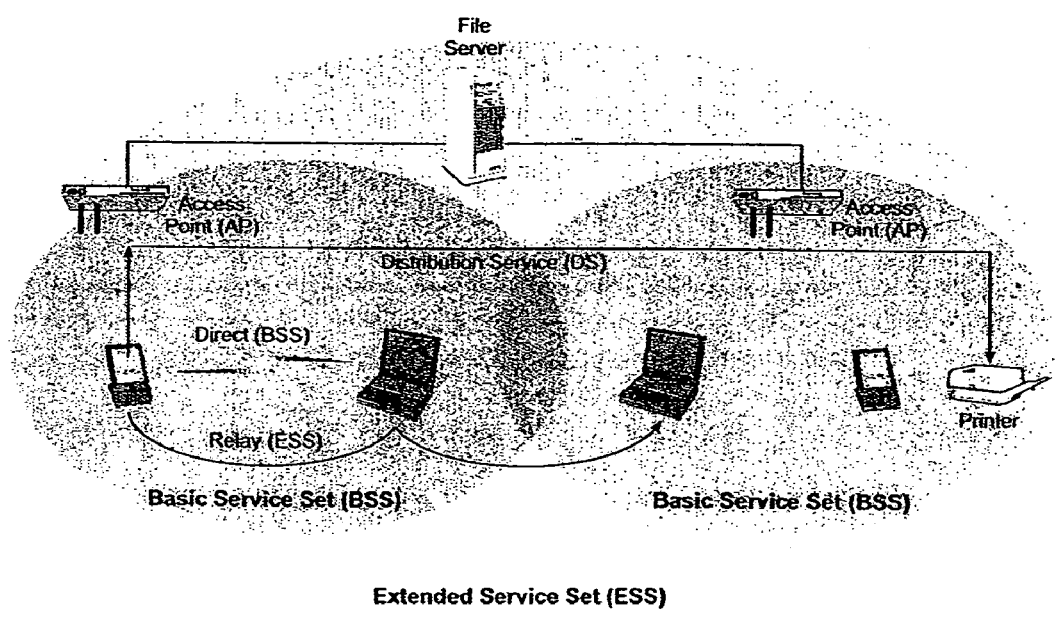
Figure 1: 802.11 Wireless Local Area Network (WLAN)
(Prior Art)

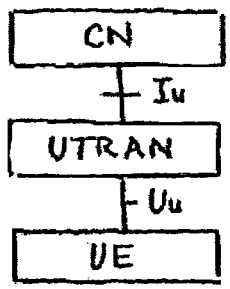
Figure 2a: The Basic 3GPP Network
PRIOR ART
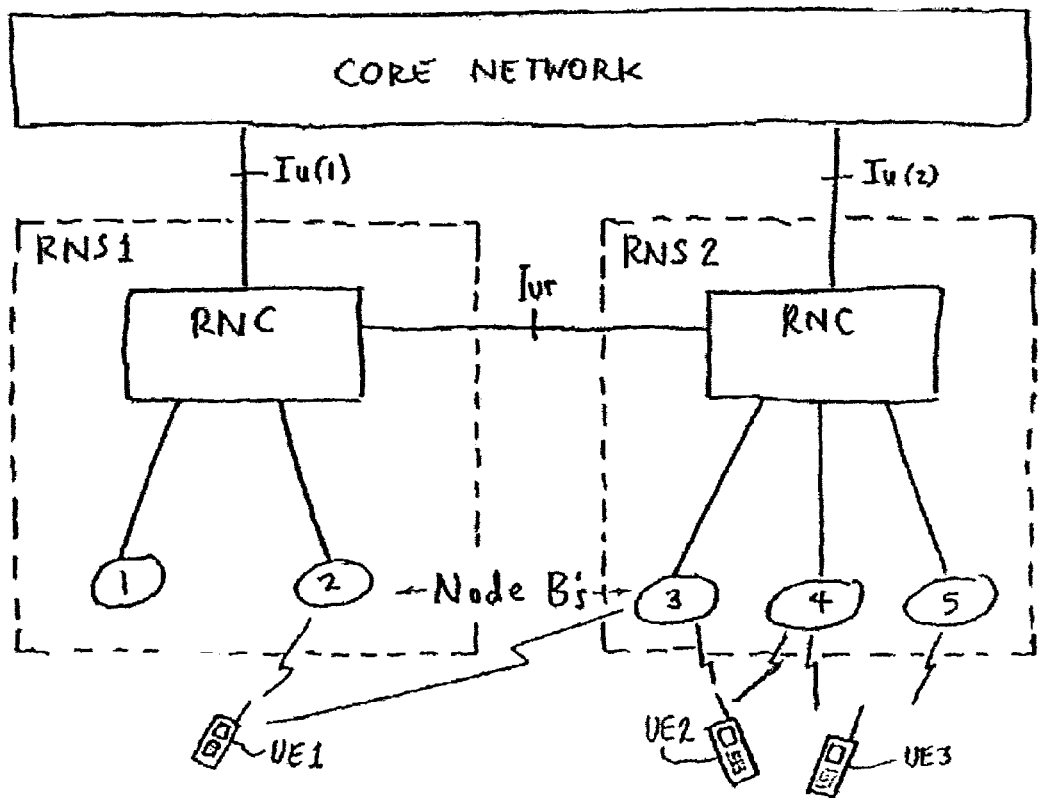
Figure 2b: The 3GPP Network in More Detail
(Prior Art)

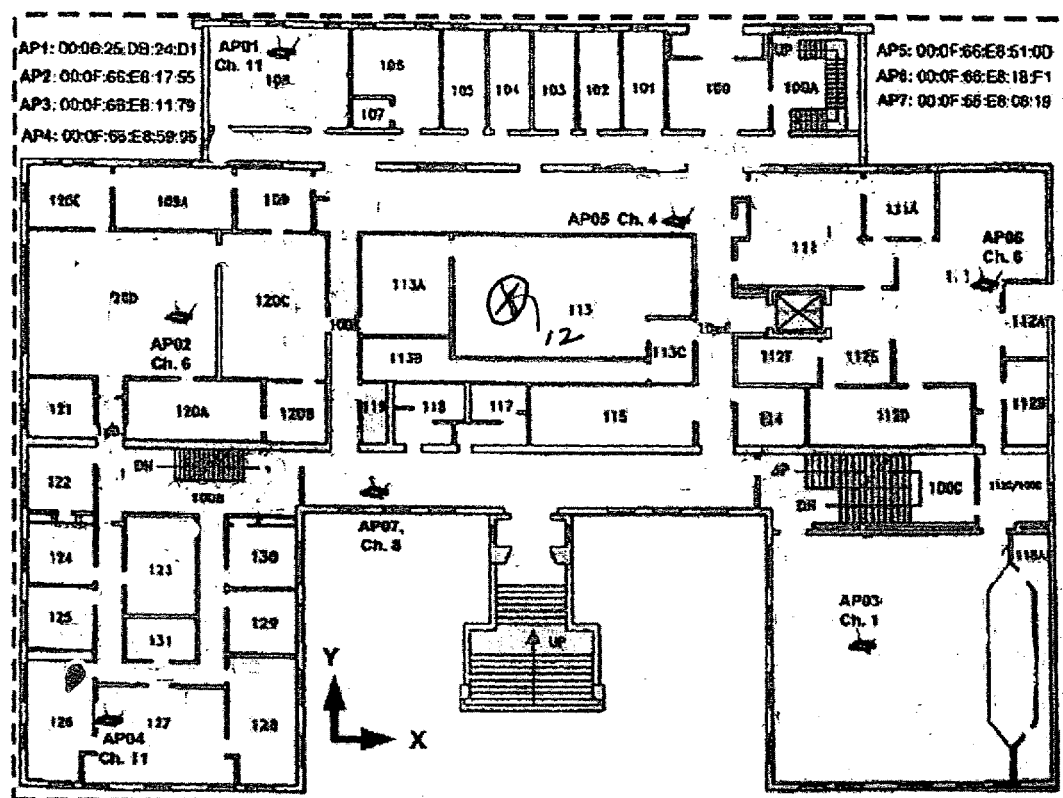
Figure 3: WLAN System Deployed on AWK Building 3rd Floor Plan

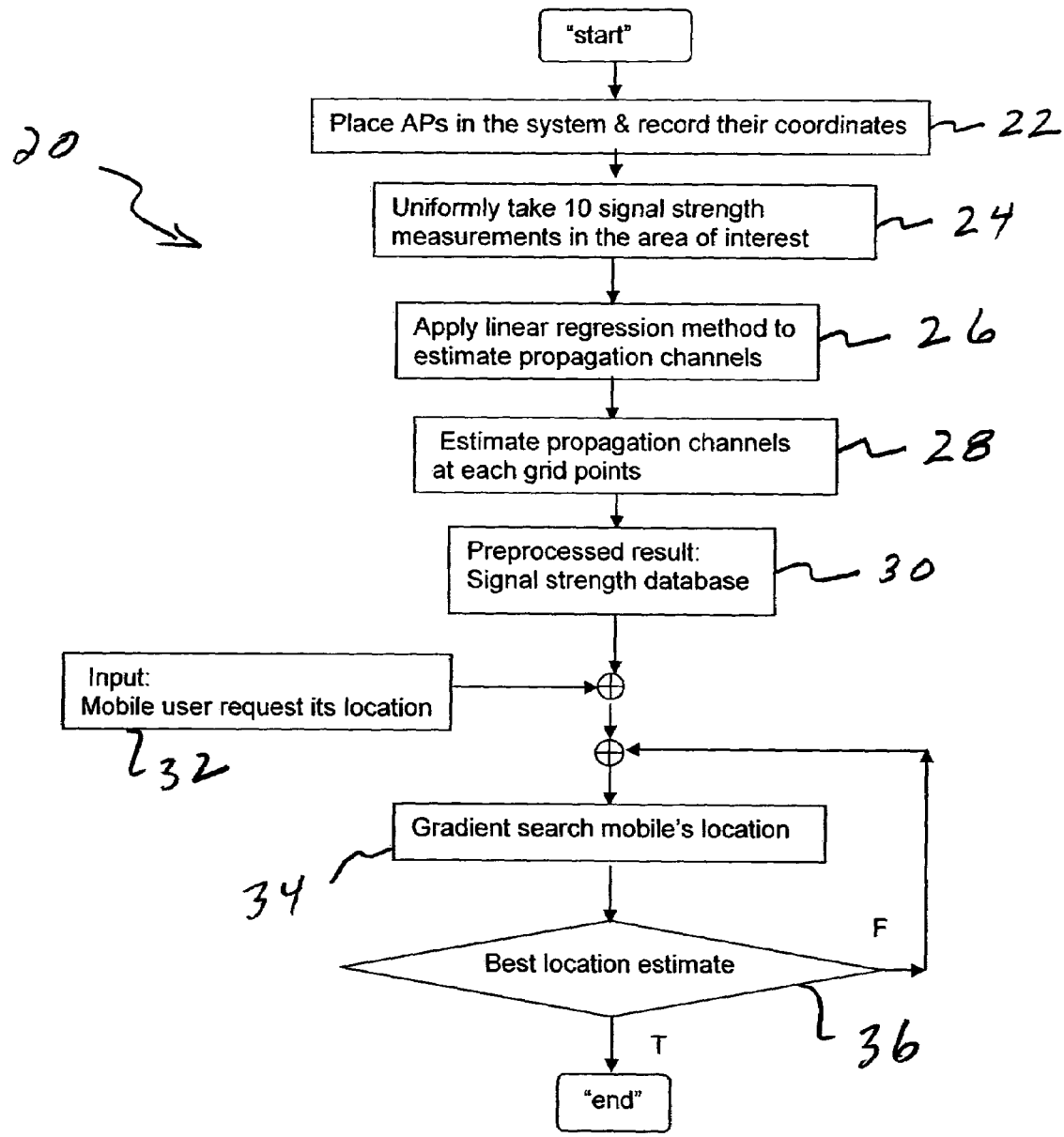
Figure 4: Flow diagram for estimating mobile location.

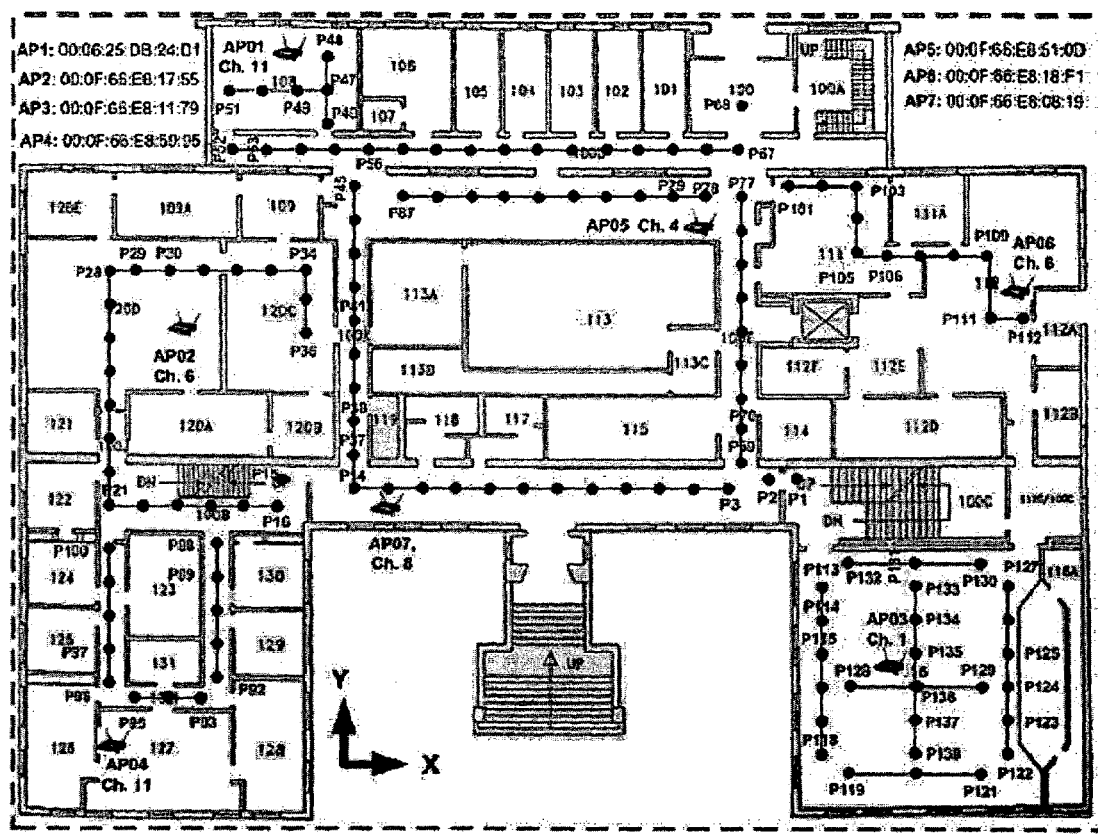
Figure 5: WLAN System Deployed on AWK Building 3rd Floor Plan (with measurement points)

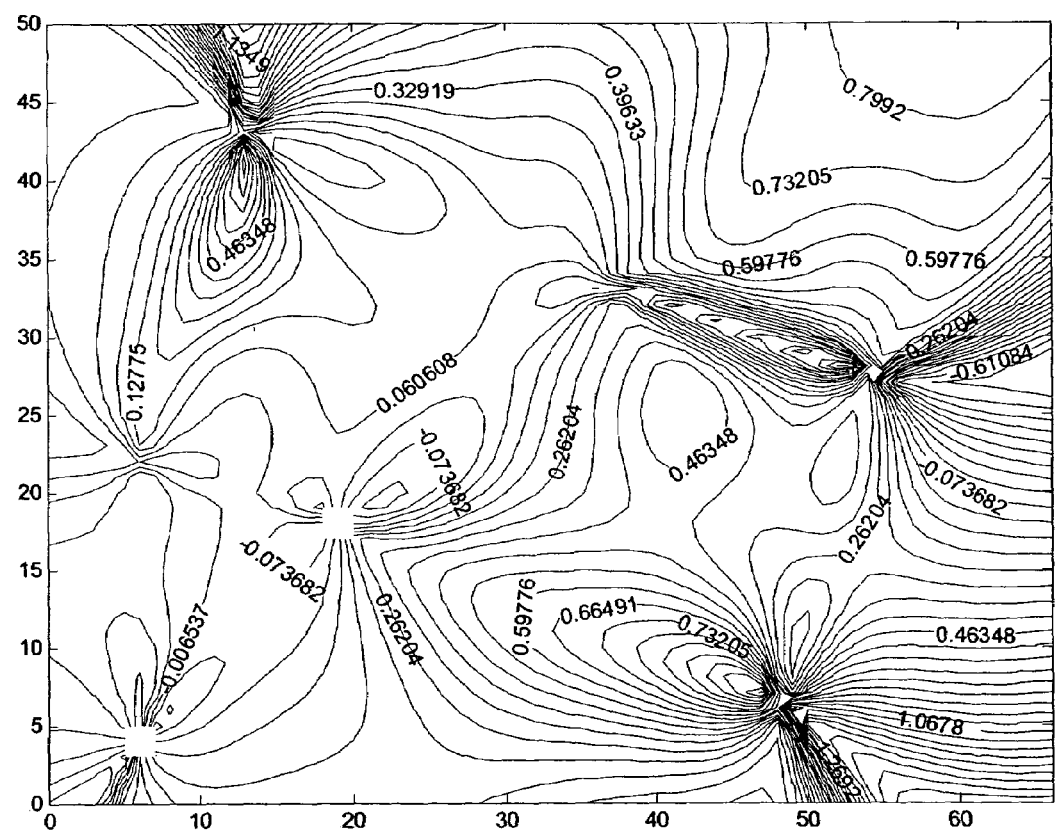
Figure 6: The Geometrical Distribution of Location Error based on 7 APs in Figure 5.

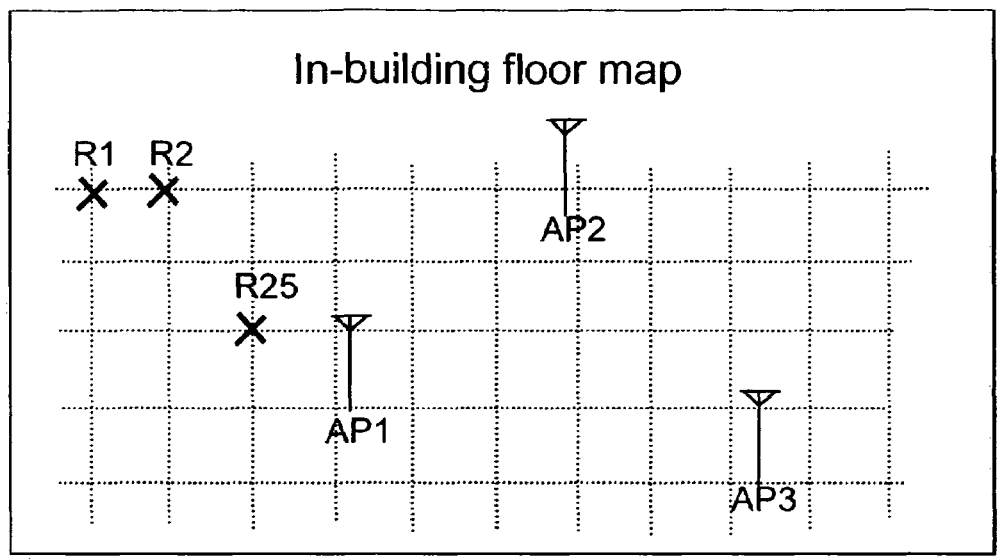
Figure 7: An example of in-building floor map topview for grid-points design.
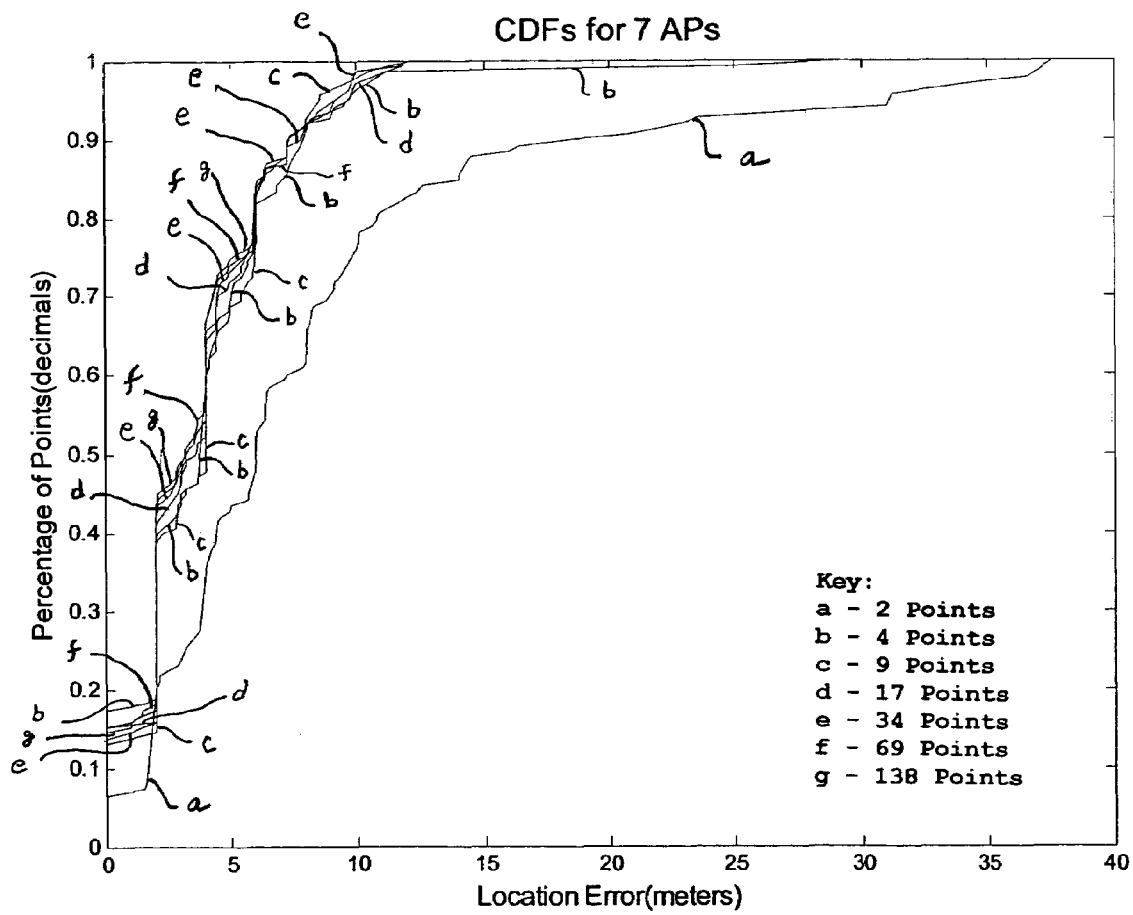
Figure 8: The location error using CDF representation with 7 APs.

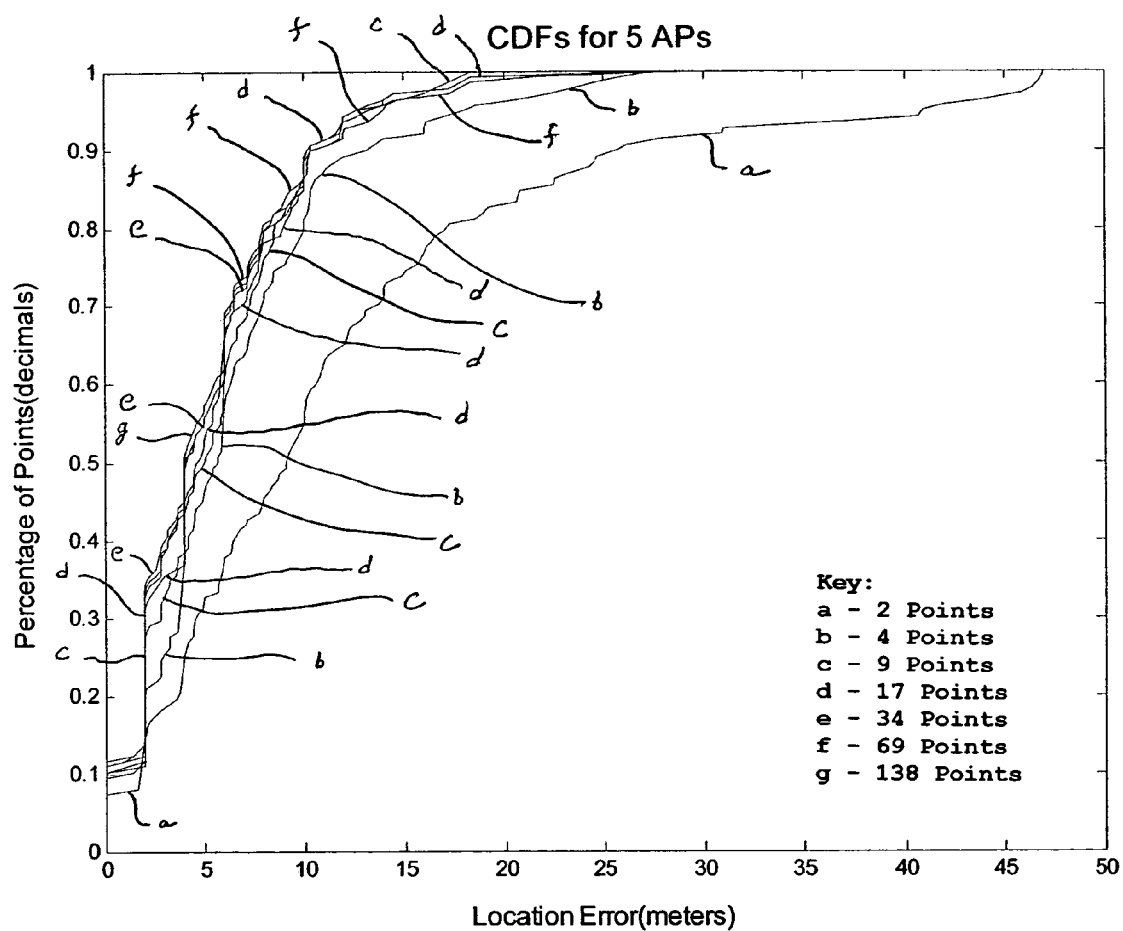
Figure 9: The location error using CDF representation with 5 APs.

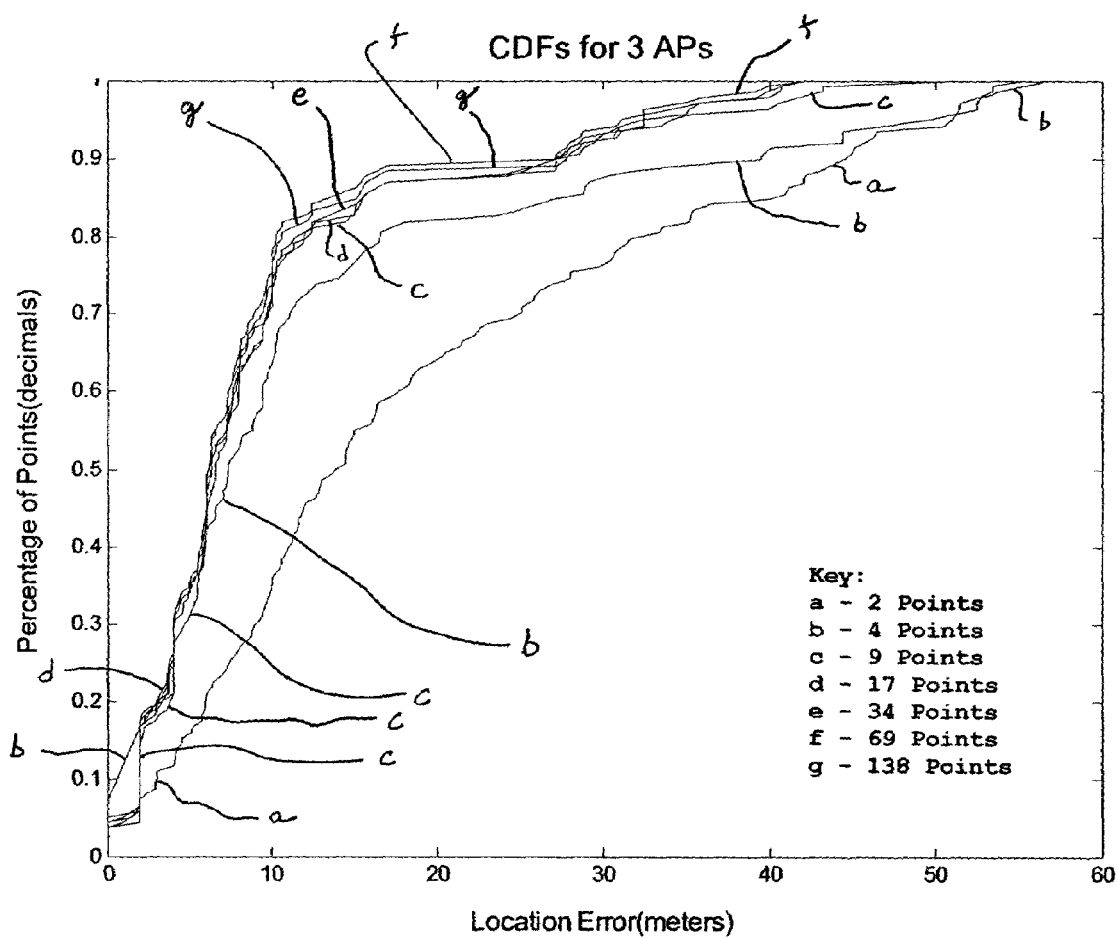
Figure 10: The location error using CDF representation with 3 APs.

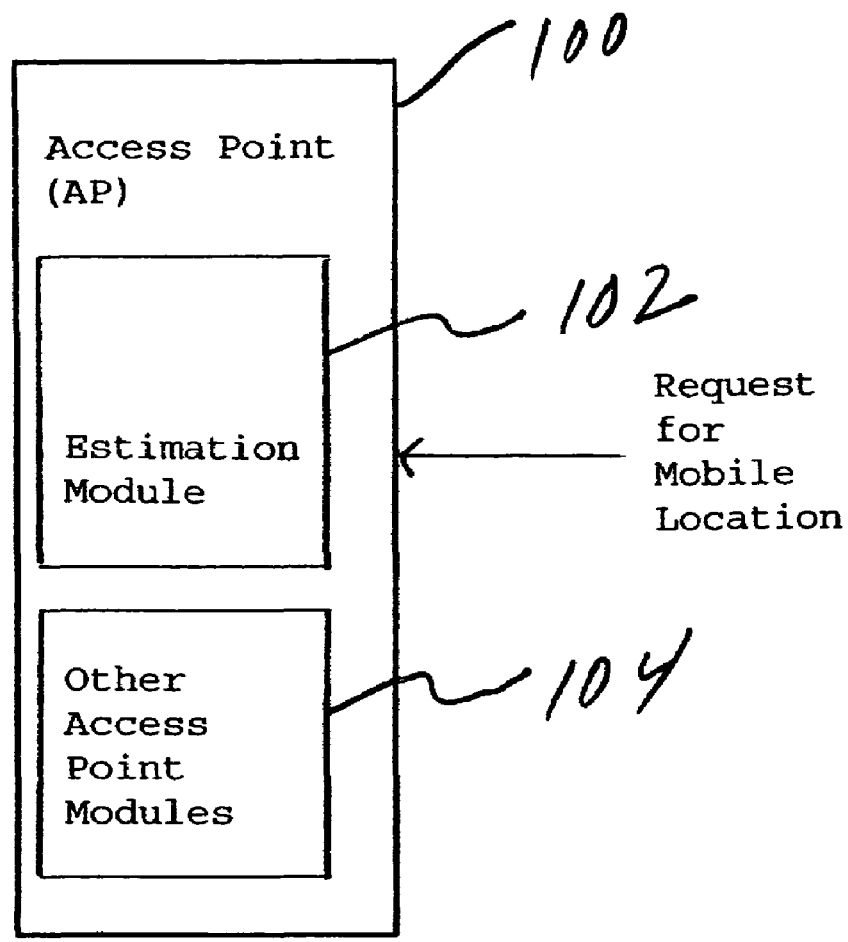
Figure 11: The Access Point (AP)

MOBILE LOCATION METHOD FOR WLAN-TYPE SYSTEMS

BACKGROUND OF THE INVENTION

1. Field of Invention

The present invention is related to a wireless local area network (WLAN) or other suitable network; and more particularly, to a new and unique method and apparatus for providing an estimate of a mobile location of a wireless node, point or terminal in an 802.11 WLAN.

2. Description of Related Art

FIG. 1 shows, by way of example, typical parts of an IEEE 802.11 WLAN system, which is known in the art and provides for communications between communications equipment such as mobile and secondary devices including personal digital assistants (PDAs), laptops and printers, etc. The WLAN system may be connected to a wire LAN system that allows wireless devices to access information and files on a file server or other suitable device or connecting to the Internet. The devices can communicate directly with each other in the absence of a base station in a so-called "ad-hoc" network, or they can communicate through a base station, called an access point (AP) in IEEE 802.11 terminology, with distributed services through the AP using local distributed services (DS) or wide area extended services, as shown. In a WLAN system, end user access devices are known as stations (STAs), which are transceivers (transmitters/receivers) that convert radio signals into digital signals that can be routed to and from communications device and connect the communications equipment to access points (APs) that receive and distribute data packets to other devices and/or networks. The STAs may take various forms ranging from wireless network interface card (NIC) adapters coupled to devices to integrated radio modules that are part of the devices, as well as an external adapter (USB), a PCMCIA card or a USB Dongle (self contained), which are all known in the art.

FIGS. 2a and 2b show diagrams of the Universal Mobile Telecommunications System (UMTS) packet network architecture, which is also known in the art. In FIG. 2a, the UMTS packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network (CN) over a (wired) Iu interface. FIG. 2b shows some further details of the architecture, particularly the UTRAN, which includes multiple Radio Network Subsystems (RNSs), each of which contains at least one Radio Network Controller (RNC). In operation, each RNC may be connected to multiple Node Bs which are the UMTS counterparts to GSM base stations. Each Node B may be in radio contact with multiple UEs via the radio interface (Uu) shown in FIG. 2a. A given UE may be in radio contact with multiple Node Bs even if one or more of the Node Bs are connected to different RNCs. For instance, a UE1 in FIG. 2b may be in radio contact with Node B2 of RNS1 and Node B3 of RNS2 where Node B2 and Node B3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC. The convergence of the IEEE 802.11 WLAN system in FIG. 1 and the (UMTS) packet network architecture in FIGS. 2a and 2b has resulted in STAs taking the form of UEs, such as mobile phones or mobile terminals.

The interworking of the WLAN (IEEE 802.11) shown in FIG. 1 with such other technologies (e.g. 3GPP, 3GPP2 or 802.16) such as that shown in FIGS. 2a and 2b is being defined at present in protocol specifications for 3GPP and 3GPP2.

The IEEE 802.11 WLAN system in FIG. 1 and the (UMTS) packet network architecture in FIGS. 2a and 2b, and the convergence thereof, must meet certain requirements, including those set forth by the Federal Communications Commission (FCC). In particular, the FCC has recently defined a set of accuracy requirements for E-911 calls, which are collectively known in the industry as the E-911 Phase II mandate. The mandate states that handset-based solutions should locate the E-911 caller to within 50 meters for 67% of the calls and to within 150 meters for 95% of the calls. The new ALI (Automatic Location Identification)-capable handsets must fulfill the FCC's E-911 Phase II location accuracy requirement.

Several location systems have been designed for wide-area cellular systems in the art. Two of the most prevalent technologies are the AFLT (Advanced Forward-Link Trilateration) and AGPS (Assisted GPS) methods. While these systems have been found to be promising for outdoor environments, their effectiveness in indoor environments is limited by the severe indoor multipath effect and in-building penetration loss, which, in particular, limits the reception of GPS transmissions. There are also some indoor location systems that rely on specialized hardware solutions, such as IR (infrared) and RFID-based technologies. However, these indoor location systems typically suffer from limited range and they also require extensive deployment of an infrastructure whose sole purpose is to locate people.

The present invention provides a new and effective approach for meeting the requirements of the E-911 Phase II mandate as well as the voice/data communications.

SUMMARY OF THE INVENTION

In its broadest sense, the present invention provides a new and unique method and apparatus for providing an estimate of a mobile location of a wireless node, point or terminal in a wireless local area network (WLAN) or other suitable network, wherein the estimate is based on a correlation of a radio frequency (RF) signal strength measurement and a grid point in a signal strength database or radio map.

The signal strength database or radio map is built using a signal strength fingerprint algorithm, which includes steps of selecting and measuring a set of grid points in the wireless local area network (WLAN) or other suitable network. The signal fingerprint algorithm includes using linear regression parameters to estimate mobile received signal strengths at each assigned grid point, as well as recording grid positions and signal strength measurements.

The signal strength fingerprint algorithm may include one or more of the following steps: placing access points (APs) in the wireless local area network (WLAN) or other suitable network and recording their coordinates; taking signal strengths measurements in areas of interest in the wireless local area network (WLAN) or other suitable network; applying a linear regression method to estimate propagation channels; estimating propagation channels at each grid point; and/or processing the results so as to form the signal strength database or radio map.

The data structure entry for each grid point is defined as $$R_i = \left\{ \begin{array}{c} P(x_i, y_i, z_i) \\ SS_{i,j} \end{array} \right\},$$

where i represents an identification number (ID) for each grid point, $R_i$ is the estimated received information at the i-th grid point, $P(x_i, y_i, z_i)$ is the physical location of the i-th grid point, and $SS_{i,j}$ is the average received signal strengths from the j-th AP's transmission at the i-th grid point.

In operation, in response to a request from the wireless node, point or terminal, a gradient search is used to determine the estimate.

The grid point may include an access point (AP) in the wireless local area network (WLAN) or other suitable network.

The wireless node, point or terminal may include a station (STA), as well as user equipment (UE) such as a mobile terminal, phone, laptop computer, personal digital assistant, etc.

The steps of method may be implemented via a computer program running in a processor, controller or other suitable module in one or more network nodes, points, terminals or elements in the wireless local area network (WLAN) or other suitable network.

The present invention also includes apparatus that may take the form of a wireless local area network (WLAN) or other suitable network having a network node, point or element with a module for providing an estimate of a mobile location of a wireless node, point or terminal therein, wherein the estimate is based on a correlation of a radio frequency (RF) signal strength measurement and a grid point in a signal strength database or radio map, as well as a network node, point or element for operating in such a wireless local area network (WLAN) or other suitable network, where the network node, point or element has a module for providing such an estimate of the mobile location of the wireless node, point or terminal in the wireless local area network (WLAN) or other suitable network, consistent with that described herein.

The present invention also includes a computer program product with a program code, which program code is stored on a machine readable carrier, for carrying out the steps of a method comprising one or more steps for providing an estimate of a mobile location of a wireless node, point or terminal in a wireless local area network (WLAN) or other suitable network, the estimate being based on a correlation of a radio frequency (RF) signal strength measurement and a grid point in a signal strength database or radio map, when the computer program is run in a module of either a node, point or terminal, such as an Access Point (AP) or other suitable grid point, in the wireless local area network (WLAN) or other suitable network.

The present invention also includes a method for building a database using a signal strength fingerprint algorithm for use in providing an estimate of a mobile location of a wireless node, point or terminal in a wireless local area network (WLAN) or other suitable network arranged in a geographic location, including steps for placing access points (APs) or other suitable grid points in the wireless local area network (WLAN) or other suitable network and recording their coordinates in the geographic location; taking signal strengths measurements in areas of interest in the wireless local area network (WLAN) or other suitable network; applying a linear regression method to estimate propagation channels; estimating propagation channels at each access or other suitable grid point; and processing the results so as to form the signal strength database or radio map.

In effect, the present invention provides a design of a WLAN system architecture that is simpler, faster, more robust, and more relatively accurate mobile-location-estimate than the existing solutions. The new location scheme is also related to the use of signal strength fingerprinting concept for the localized wireless area. According to the present invention, the key concept of the fingerprinting algorithm is to build a signal strength database (or "radio map") at each grid point in the area of interest, then to use this radio map to correlate an RF signal strength measurement to one of the grid points.

In addition, the present invention provides a software-only location solution that uses "off-the-shelf" WLAN data transmission equipment. Since the presence of multipath makes the time-of-arrival technique unsuitable for indoor applications, an RF signal strength pattern-matching technique (or RF fingerprinting method) is designed to locate the mobile user. The present invention provides a method that (1) significantly reduces the number of signal strength measurements to less than 10 test points for a building area of 40 meters by 50 meters, and (2) provides fast estimates of the mobile's coordinates using a gradient search method. The results of experiments show that the mobile location error of our invention method can be less than 10 meters of 67%-tier with three access points in a building area of 40-meters by 50-meters. Accordingly, this method provides a simpler, faster, more robust, and more accurate mobile-location-estimate than the existing solutions.

BRIEF DESCRIPTION OF THE DRAWING

The drawing includes the following Figures, which are not necessarily drawn to scale:

FIG. 1 shows typical parts of an IEEE 802.11 WLAN system, which is known in the art.

FIGS. 2a and 2b show diagrams of the Universal Mobile Telecommunications System (UMTS) packet network architecture, which is also known in the art.

FIG. 3 is a floor plan of the third floor of the Atwater Kent Engineering Building at the Worcester Polytechnic Institute with a WLAN system according to the present invention.

FIG. 4 shows a flow diagram for estimating mobile location according to the present invention.

FIG. 5 is the floor plan of the third floor of the Atwater Kent Engineering Building at the Worcester Polytechnic Institute shown in FIG. 3, having points 1-138 for modeling the method and apparatus according to the present invention.

FIG. 6 shows a geometrical distribution of location error based on 7 APs shown in FIG. 5.

FIG. 7 shows an example of in-building floor map top view for grid-points design according to the present invention.

FIG. 8 shows the location error using a Cumulative Distribution Function (CDF) representation with 7 APs according to the present invention.

FIG. 9 shows the location error using a CDF representation with 5 APs according to the present invention.

FIG. 10 shows the location error using a CDF representation with 3 APs according to the present invention.

FIG. 11 shows an access point (AP) or other suitable network node, point or element having an estimation module according to the present invention.

BEST MODE OF THE INVENTION

The present invention provides a new and unique method and apparatus for providing an estimate of a mobile location of a wireless node, point or terminal in a wireless local area network (WLAN) or other suitable network that includes, for example, access points AP01, AP02, AP03, AP04, AP05, AP06, AP07 on a floor generally indicated as 10 of a building or other suitable geographic location such as that shown in FIG. 3 (which is a floor plan of the third floor of the Atwater Kent Engineering Building at the Worcester Polytechnic Institute). According to the present invention, the estimate of the mobile location of the wireless node, point or terminal is based on a correlation of a radio frequency (RF) signal strength measurement and a grid point in a signal strength database or radio map, consistent with that shown and described herein.

FIG. 3 also shows a mobile phone or terminal, for example, at the mobile location marked by an "X" and labelled 12 in Room 113. In operation, when the user of the mobile phone or terminal calls "911", the wireless local area network (WLAN) or other suitable network has a network node, point or element having a module for providing the mobile phone or terminal, or the local police, or other governmental or commercial agency, or other suitable party requesting the same, with the estimate of the mobile location of the mobile phone or terminal, including but not limited to for the case shown in FIG. 3 the address of the building, the floor and the room, etc., so that help may be sent to that location as soon as possible. The scope of the invention is not intended to be limited in any way to the type or kind of information that forms part of the estimation, or to who the information is provided, or to when the information is provided, or by how the information is provided, etc.

According to the present invention, the signal strength database or radio map is built using a signal strength fingerprint algorithm, which includes steps of selecting and measuring a set of grid points in the WLAN or other suitable network as described below. The signal fingerprint algorithm includes using linear regression parameters to estimate mobile received signal strengths at each assigned grid point, as well as recording grid positions and signal strength measurements.

By way of example, FIG. 4 shows a flow diagram generally indicated as 20 for estimating mobile locations, having steps that form part of the signal strength fingerprint algorithm, including a step 22 for placing access points (APs) in the WLAN or other suitable network and recording their coordinates; a step 24 for taking signal strengths measurements in areas of interest in the wireless local area network (WLAN) or other suitable network; a step 26 applying a linear regression method to estimate propagation channels; a step 28 estimating propagation channels at each grid point and a step 30 for processing the results so as to form the signal strength database or radio map. These steps are described in more detail in relation to FIGS. 5-10 below.

In response to a mobile user request of its location indicated in step 32, or similarly in response to a request from any authorized party, including the local police, other governmental or commercial agency, or other suitable party requesting the same, a gradient search of the mobile's location is performed in step 34 in order to determine the estimate of the mobile location of the wireless node, point or terminal based on the correlation of the radio frequency (RF) signal strength measurement and the grid point in the signal strength database or radio map. The search is performed until a best location estimate is determined in step 36.

Measurement Data for Location Error Analysis

In order to appreciate the method for creating the signal strength or radio map database, important observations/results that have been deduced from real measurements are set forth below.

First, two sets of measurement results were analyzed that were taken on the third floor of the Atwater Kent Engineering Building at the Worcester Polytechnic Institute seen the floor plan seen in FIG. 3. The seven AP signals were detected and their location coordinates (x, y, z) were recorded. As best shown in FIG. 5, receiver signal strength were collected with respect to all seven APs at 138 different measurement points (i.e., P1, P2, P3, . . . , P138). Each measurement point (e.g., at point P1) collects 100 instantaneous signal strengths (or samples) from each of APs (i.e., AP1, AP2, . . . , AP7). So that, each measurement point can be described by a histogram distribution (or a CDF curve) as well as an average received signal strength that is the mean value of the 100 signal strength samples.

Second, by applying linear regression to the two sets of measurement data (i.e., Campaign_1 data set and Campaign_2 data set are measured on different days and at different times-of-day) based on the floor plan of FIG. 5, one can find seven different linear regression curves to represent the path loss for seven different APs. This set the framework for the indoor geolocation method according to the present invention that is based on average signal strength modeling. A linear regression method was applied as the model for signal strength and this model has been applied to the two sets of measurement data (i.e., Campaign 1 data and Campaign 2 data). The statistical model for signal propagation developed here is used to assess the geolocation error that is incurred when using signal strength-based methods. The location error is a function of the position of a mobile client and the set of AP positions. This error analysis provides the error bound which is used to determine optimal locations of the set of APs and evaluate the range of location error geometrically. The detailed error bound analysis is as following. It is important to note that linear regression methods and techniques are known in the art, and the scope of the invention is not intended to be limited to any particular type or kind thereof either now known or later developed in the future.

Linear Regression Analysis

An empirical signal propagation model of the received signal is given by:

$$P(r)[dBm] = P(r_0)[dBm] - 10\alpha \log(r/r_0) \quad (1)$$

where P(r) is the received power at a mobile device whose distance from a given AP transmitter is r; and $P(r_0)$ is the signal power at the reference point, $r_0$. The parameter $\alpha$ is the path loss exponent value.

One can estimate the unknown parameters $\hat{P}(r_0)$ and $\hat{\alpha}$ by applying linear regression analysis and using the minimum least squares estimation method:

Let us define:

$$P_w(r) = P(r_0) + \alpha \rho_i \quad (2)$$

where $\rho_i = -10 \log(r_i/r_0)$.

The cost function is defined as:

$$J = \sum_{i=1}^{m} [P_W(r_i) - \hat{P}_W(r_i)]^2 \quad (3)$$

$$= \sum_{i=1}^{m} [P_W(r_i) - (\hat{P}(r_0) + \hat{\alpha}\rho_i)]^2$$

$$= \sum_{i=1}^{M} P_W^2(r_i) - 2\sum_{i=1}^{M} P_W(r_i)(\hat{P}(r_0) + \hat{\alpha}\rho_i) + \sum_{i=1}^{m} (\hat{P}(r_0) + \hat{\alpha}\rho_i)^2$$

where m is the number of samples. Taking the derivative of the cost function with respect to the path loss exponent and the received power, and equating it zero, we derive the following two relations:

$$\frac{\partial J}{\partial \hat{\alpha}} = 0 = \sum_{i=1}^{m} [P_W(r_i) - (\hat{P}(r_0) + \hat{\alpha}\rho_i)]\rho_i \quad (4)$$

and $$\frac{\partial J}{\partial \hat{P}(r_0)} = 0 = (-2)\sum_{i=1}^{m} [P_W(r_i) - (\hat{P}(r_0) + \hat{\alpha}\rho_i)]. \quad (5)$$

Combining these two equations, we obtain the following four (equivalent) feasible solutions:

$$\hat{\alpha} = \frac{\sum_{i=1}^{m} [\rho_i - \bar{\rho}]P_W(r_i)}{\sum_{i=1}^{m} (\rho_i - \bar{\rho})^2} \quad (6)$$

$$= \frac{\sum_{i=1}^{m} \rho_i [P_W(r_i) - \bar{P}_W]}{\sum_{i=1}^{m} (\rho_i - \bar{\rho})^2}$$

$$= \frac{\sum_{i=1}^{m} [\rho_i - \bar{\rho}]P_W(r_i)}{\sum_{i=1}^{m} \rho_i^2 - m\bar{\rho}^2}$$

$$= \frac{\sum_{i=1}^{m} \rho_i [P_W(r_i) - \bar{P}_W]}{\sum_{i=1}^{m} \rho_i^2 - m\bar{\rho}^2}$$

and $\hat{P}(r_0)[dBm] = \bar{P}_W[dBm] - \hat{\alpha}\bar{\rho}$ (7)

where $\bar{\rho} = \frac{1}{m}\sum_{i=1}^{m} \rho_i$ and $\bar{P}_W[dBm]$ $$= \frac{1}{m}\sum_{i=1}^{m} P_W(r_i)[dBm].$$

Multiple Regression Analysis

Multiple regression is an extension of linear regression analysis. It takes into account the effects of more than one predictor variable on the dependent variable. We can determine the two factors ($P(r_0)$, $\alpha$) simultaneously by using one predictor variable (the distance r). The multiple regression model is:

$$P = G\beta \quad (8)$$

where $$P = \begin{bmatrix} P(r_1) \\ P(r_2) \\ \vdots \\ P(r_m) \end{bmatrix}, \quad (9)$$

$$G = \begin{bmatrix} 1 & -10\log(r_1/r_0) \\ 1 & -10\log(r_2/r_0) \\ \vdots & \vdots \\ 1 & -10\log(r_m/r_0) \end{bmatrix},$$

and $\beta = \begin{bmatrix} P(r_0) \\ \alpha \end{bmatrix}$. (10)

The least-square estimate of the unknown parameter vector, $\hat{\beta}$, is given by:

$$\hat{\beta} = (G'G)^{-1}G'P \quad (11)$$

The standard deviation of the predicted signal strength is given by $$\sigma_P = \sqrt{\frac{1}{m}(P' - \hat{\beta}'G')\cdot(P' - \hat{\beta}'G')'}$$

since $$(P'-\hat{\beta}'G')\cdot(P'-\hat{\beta}'G')' = (P'-\hat{\beta}'G')P - (P'-\hat{\beta}'G')G\hat{\beta} \quad (12)$$

where $$(P'-\hat{\beta}'G')G\hat{\beta} = P'G'G\hat{\beta} - \hat{\beta}'G'G\hat{\beta} = P'G\hat{\beta} - P'G(G'G)^{-1}G'G\hat{\beta} = 0 \quad (13)$$

and $$\hat{\beta} = (G'G)^{-1}G'P \quad (14)$$

Therefore, $$\sigma_P = \sqrt{\frac{1}{m}(P' - \hat{\beta}'G')P}. \quad (15)$$

One can use this result on the standard deviation to estimate the location error, as illustrated in the next section.

Estimation of Location Error

One can determine the relation between the location error and error in signal strength prediction by applying a differential operation from Equation (5) with respect to the x and y coordinates.

$$dP_i(x, y) = -\frac{10\alpha_i}{\ln 10}\left(\frac{x - x_i}{r_i^2}dx + \frac{y - y_i}{r_i^2}dy\right) \quad (16)$$

where i=1,2, ..., N.

Equation (20) can be written in matrix form as:

$$dP = H \cdot dr \quad (17)$$

where $$dP = \begin{bmatrix} dP(r_1) \\ dP(r_2) \\ \vdots \\ dP(r_N) \end{bmatrix}, \quad (18)$$

$$H = \begin{bmatrix} -\frac{10\alpha_1}{\ln 10}\frac{x-x_1}{r_1^2} & -\frac{10\alpha_1}{\ln 10}\frac{y-y_1}{r_1^2} \\ -\frac{10\alpha_2}{\ln 10}\frac{x-x_2}{r_2^2} & -\frac{10\alpha_2}{\ln 10}\frac{y-y_2}{r_{21}^2} \\ \vdots & \vdots \\ -\frac{10\alpha_N}{\ln 10}\frac{x-x_N}{r_N^2} & -\frac{10\alpha_N}{\ln 10}\frac{y-y_N}{r_{N1}^2} \end{bmatrix},$$

$$dr = \begin{bmatrix} dx \\ dy \end{bmatrix}$$

and $\alpha_1, \alpha_2, \ldots, \alpha_N$ in the H matrix are based on the linear regression calculations based on measurements made from AP1, AP2, . . . , APN.

By considering the least square estimation, one can relate the location error to an error in power estimation, dP.

$$d\hat{r} = (H'H)^{-1}H'dP. \quad (19)$$

Since $\text{Cov}(dP_i, dP_j) = \begin{bmatrix} \sigma_{p1}^2 & 0 & 0 \\ 0 & \sigma_{p2}^2 & 0 \\ 0 & 0 & \sigma_{p3}^2 \end{bmatrix}$ $$\begin{aligned} \text{Cov}(d\hat{r}) &= E\{d\hat{r} \cdot d\hat{r}\} \\ &= E\{(H'H)^{-1}H'dP \cdot dP'H[(H'H)^{-1}]'\} \\ &= (H'H)^{-1}H' \cdot \begin{bmatrix} \sigma_{p1}^2 & 0 & 0 \\ 0 & \sigma_{p2}^2 & 0 \\ 0 & 0 & \sigma_{p3}^2 \end{bmatrix} \cdot H(H'H)^{-1} \end{aligned} \quad (20)$$

The standard deviation of location error is finally estimated as $$\sigma_r = \sqrt{\sigma_x^2 + \sigma_y^2} \quad (21)$$

By using Equations (20) and (21), the resulting Geometrical Distribution of Location Error with 7 APs based on the FIG. 5 floor plan has been shown in FIG. 6. FIG. 6 is the difference of the location error between Campaign_1 data set and Campaign_2 data set. The result shows that the maximum location error is close to 1 meter.

In summary, the location error estimated using the average signal strength scheme is almost no different when comparing results from Campaign_1 data to Campaign_2 data. This implies that this average signal strength method is a robust method to estimate the mobile. If one uses the histogram distribution (or, using CDF curve) instead of using average signal strength method to estimate location error, than it is no longer a time-invariant system and the CDF distribution fingerprinting method fails to estimate the mobile location. However, the average signal strength fingerprinting method may be used and it provides simple and robust mobile location estimation.

CDF Location Error Representation

First, consistent with the present invention, in the experiment 7 access points (APs) were arranged in a WLAN system as in FIG. 5. 138 signal strength measurement points were used to determine the linear regression curve with respect to each different AP propagation channel. These linear regression curves were used to estimate (or predict) mobile received signal strengths at each assigned grid point (e.g., the grid point is distributed in every 2-meter by 2-meter on the area of interest and the concept is presented in FIG. 7. Since the signals received at each point (P1, P2, . . . , P138) are measured and each point coordinates is known, one can use these points as test points to calculate the CDF location error curve. For example, one can take P1 as a test point and use gradient search method to find the minimum signal strengths by moving the mobile location. The location error is a CDF curve based on the 138 test points. In FIG. 8-10, one can uniformly select 138, 69, 34, 17, 9, 4, 2 signal strength measurement points to determine the linear regress curve. It is noteworthy that the location error CDF curves are similar by using 138 points or 9 points to calculate linear regression for even 3 APs seen in FIG. 10. These results lead to the conclusion that the method according to the present invention is an effective mobile location method. Moreover, CDF methods and techniques are known in the art, and the scope of the invention is not intended to be limited to any particular type or kind thereof either now known or later developed in the future.

Estimated Data Base Creation

Due to the measurement data analysis above, one only needs to uniformly select and measure less than 10 points in a typical 40-meter by 50-meter building. If the building area is larger than this typical 40 m by 50 m building, then one may need to add several measurement points. One can just use these measurement points (i.e., less than 10 measurement points) to calculate the linear regression parameters (no non-linear regression calculation is needed). Then, one can use these linear regression parameters to estimate (or predict) mobile received signal strengths at each assigned grid point which is distributed in every 2-meter by 2-meter square on the area of interest.

The grid position and the signal strength measurements will be recorded. The data structure entry for each grid point is defined as $$R_i = \left\{ \begin{array}{c} P(x_i, y_i, z_i) \\ SS_{i,j} \end{array} \right\},$$

where i represents the ID number for each grid point, $R_i$ is the estimated received information at the i-th grid point, $P(x_i, y_i, z_i)$ is the physical location of the i-th grid point, $SS_{i,j}$ is the average received signal strengths from the j-th AP's transmission at the i-th grid point.

The present invention provides a simple method to uniformly measure several points in the area of interest, since linear regression does not need many measurement points to characterize the propagation channel. If one wants to use non-linear regression to characterize the channel, one would have to use many measurement points (e.g., more than 100 points). But, the location error only improved in the order of centimeters.

Mobile Location Estimation

We use these linear regression curves deduced from real measurement to estimate (or predict) mobile received signal strengths at each assigned grid point (e.g., the grid point is distributed in every 2-meter by 2-meter on the area of interest in FIG. 7. When a mobile user requests its own location, the mobile location center uses gradient search method to estimate the user location. The flow chart for estimating mobile location is described in FIG. 4.

Gradient Searching

Gradient searching methods and techniques are know in the art, and the scope of the invention is not intended to be limited to any particular type or kind thereof either now known or later developed in the future. One such method or technique can find the local minimum by defining a measurement at the mobile location (x, y), randomly selecting an initial guess (x0, y0), and applying a linear regression channel to move the initial guess to a location which is most close to the (x, y) location.

The Access Point (AP) or Grid Point

The node, point or terminals in the WLAN for making the estimation may take the form of an access point (AP) or other suitable network node, point or terminal 100 shown in FIG. 11. The AP 100 has an estimation module 102 for providing the estimation based on the correlation of the radio frequency (RF) signal strength measurement and the grid point in the signal strength database or radio map, consistent with that described herein, as well as other access point modules 104.

The functionality of the module 102 may be implemented using hardware, software, firmware, or a combination thereof, although the scope of the invention is not intended to be limited to any particular embodiment thereof. In a typical software implementation, the module 102 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the module 102 being a stand alone module, as shown, or in the combination with other circuitry for implementing another module.

The other access point modules 104 and the functionality thereof are known in the art, do not form part of the underlying invention per se, and are not described in detail herein. For example, the other access point modules 104 may include a module for providing the estimation of the mobile location to another node, point or element that forms part of the WLAN, including a station (STA) or another access point (AP), as well as for providing the mobile location estimate information directly to the local police, other governmental or commercial agency, or other suitable party requesting the same.

The scope of the invention is also intended to include implementing the estimation module in each access point, some access points, or some other network node, point or element in the WLAN dedicated to performing this function.

The Building of the Signal Strength Database or Radio Map

The signal strength database or radio map may be built by collecting data using "off-the-shelf" WLAN data transmission equipment and techniques that are known in the art; and a person skilled in the art without undue experimentation would appreciate how to implement the signal strength database or radio map using such equipment and techniques, consistent with that shown and described herein.

When implemented, the signal strength database or radio map is relatively small, and may easily be stored in each building. For example, the access point reference signal power and the linear regression slope value may be stored. Since each building has its own channel response, the mobile location error may be less than 4-8 meters.

CONCLUSIONS

The present invention provides a systematic approach to describe the mobile location method based on propagation channel measurements for WLAN-type systems. There are several innovative steps that have been combined in order to achieve a simpler, faster, more robust, and more accurate mobile-location-estimate than the existing solutions. First, the invention provides for the use of linear regression method to reduce the RF signal strength measurement points which significantly reduce the measurement labor time and make the RF fingerprinting method robust to use. Second, the invention provides for the use of a gradient search method to speed up the location calculation process. Finally, the location accuracy is much better than FCC's E-911 phase II requirements.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What we claim is:
1. A method comprising:
providing an estimate of a mobile location of a wireless node, point or terminal in a wireless local area network or other suitable network, the estimate being based at least partly on a correlation of a radio frequency signal strength measurement and a grid point in a signal strength database or radio map;
the signal strength database or radio map being built using a signal strength fingerprint algorithm that includes recording grid positions and signal strength measurements;
a data structure entry for each grid point being based at least partly on an identification number for each grid point, an estimated received information at a respective grid point, a physical location of the respective grid point, and received signal strength information from a respective transmission of an access point at the respective grid point; and the signal strength fingerprint algorithm including:

placing access points in the wireless local area network or other suitable network and recording their coordinates;

taking signal strengths measurements in areas of interest in the wireless local area network or other suitable network;

applying a linear regression method to estimate propagation channels;

estimating propagation channels at each grid point; and processing the results to form the signal strength database or radio map.

2. A method according to claim 1, wherein the signal strength fingerprint algorithm includes selecting and measuring a set of grid points in the wireless local area network or other suitable network.

3. A method according to claim 1, wherein the signal fingerprint algorithm includes using linear regression parameters to estimate mobile received signal strengths at each assigned grid point.

4. A method according to claim 1, wherein the data structure entry for each grid point is defined as $$R_i = \left\{ \begin{array}{c} P(x_i, y_i, z_i) \\ SS_{i,j} \end{array} \right\},$$

where i represents the identification number for each grid point, $R_i$ is the estimated received information at an i-th grid point, $P(x_i, y_i, z_i)$ is the physical location of i-th grid point, and $SS_{i,j}$ is average received signal strengths from a j-th transmission of the access point at the i-th grid point.

5. A method according to claim 1, wherein, in response to a request from the wireless node, point or terminal, a gradient search is used to determine the estimate.

6. A method according to claim 1, wherein the grid point includes an access point in the wireless local area network or other suitable network.

7. A method according to claim 1, wherein the wireless node, point or terminal may include a station, as well as user equipment, including a mobile terminal, phone, laptop computer or personal digital assistant.

8. A method according to claim 1, wherein the method further comprises implementing the method via a computer program running in a processor, controller or other suitable module in one or more network nodes, points, terminals or elements in the wireless local area network or other suitable network.

9. A wireless local area network or other suitable network comprising:

a network node, point or element having one or more modules configured for providing an estimate of a mobile location of a wireless node, point or terminal therein, the estimate being based at least partly on a correlation of a radio frequency signal strength measurement and a grid point in a signal strength database or radio map;

the signal strength database or radio map being built using a signal strength fingerprint algorithm that includes recording grid positions and signal strength measurements;

a data structure entry for each grid point being based at least partly on an identification number for each grid point, an estimated received information at a respective grid point, a physical location of the respective grid point, and received signal strength information from a respective transmission of an access point at the respective grid point; and the signal strength fingerprint algorithm including:

placing access points in the wireless local area network or other suitable network and recording their coordinates;

taking signal strengths measurements in areas of interest in the wireless local area network or other suitable network;

applying a linear regression method to estimate propagation channels;

estimating propagation channels at each grid point; and processing the results to form the signal strength database or radio map.

10. A wireless local area network or other suitable network according to claim 9, wherein the signal strength fingerprint algorithm includes selecting and measuring a set of grid points in the wireless local area network or other suitable network.

11. A wireless local area network or other suitable network according to claim 9, wherein the signal fingerprint algorithm includes using linear regression parameters to estimate mobile received signal strengths at each assigned grid point.

12. A wireless local area network or other suitable network according to claim 9, wherein the data structure entry for each grid point is defined as $$R_i = \left\{ \begin{array}{c} P(x_i, y_i, z_i) \\ SS_{i,j} \end{array} \right\},$$

where i represents an identification number for each grid point, $R_i$ is the estimated received information at an i-th grid point, $P(x_i, y_i, z_i)$ is the physical location of the i-th grid point, and $SS_{i,j}$ is average received signal strengths from a j-th transmission of the access point at the i-th grid point.

13. A wireless local area network or other suitable network according to claim 9, wherein, in response to a request from the wireless node, point or terminal, a gradient search is used to determine the estimate.

14. A wireless local area network or other suitable network according to claim 9, wherein the grid point includes an access point in the wireless local area network or other suitable network.

15. A wireless local area network or other suitable network according to claim 9, wherein the wireless node, point or terminal includes a station, as well as user equipment, including a mobile terminal, phone, laptop computer or personal digital assistant.

16. A network node, point or element comprising:

a module configured for providing an estimate of a mobile location of a wireless node, point or terminal operating in a wireless local area network or other suitable network, the estimate being based at least partly on a correlation of a radio frequency signal strength measurement and a grid point in a signal strength database or radio map;

the signal strength database or radio map being built using a signal strength fingerprint algorithm that includes recording grid positions and signal strength measurements; and a data structure entry for each grid point being based at least partly on an identification number for each grid point, an estimated received information at a respective grid point, a physical location of the respective grid point, and received signal strength information from a respective transmission of an access point at the respective grid point; and the signal strength fingerprint algorithm including:

placing access points in the wireless local area network or other suitable network and recording their coordinates;

taking signal strengths measurements in areas of interest in the wireless local area network or other suitable network:

applying a linear regression method to estimate propagation channels;

estimating propagation channels at each grid point; and processing the results to form the signal strength database or radio map.

17. A network node, point or element according to claim 16, wherein the signal strength fingerprint algorithm includes selecting and measuring a set of grid points in the wireless local area network or other suitable network.

18. A network node, point or element according to claim 16, wherein the signal fingerprint algorithm includes using linear regression parameters to estimate mobile received signal strengths at each assigned grid point.

19. A network node, point or element according to claim 16, wherein the data structure entry for each grid point is defined as $$R_i = \left\{ \begin{array}{c} P(x_i, y_i, z_i) \\ SS_{i,j} \end{array} \right\},$$

where i represents an identification number for each grid point, $R_i$ is the estimated received information at an i-th grid point, $P(x_i, y_i, z_i)$ is the physical location of the i-th grid point, and $SS_{i,j}$ is average received signal strengths from a j-th transmission of the access point at the i-th grid point.

20. A network node, point or element according to claim 16, wherein, in response to a request from the node, point or terminal, a gradient search is used to determine the estimate.

21. A network node, point or element according to claim 16, wherein the network node, point or element is an access point or other suitable grid point in the wireless local area network or other suitable network.

22. A network node, point or element according to claim 16, wherein the wireless node, point or terminal is a station or other suitable user equipment, including a mobile terminal, a mobile phone, a laptop computer or a personal digital assistant.

23. A computer program product with a program code, which program code is stored on a machine readable carrier, for carrying out the steps of a method comprising providing an estimate of a mobile location of a wireless node, point or terminal in a wireless local area network or other suitable network, the estimate being based on a correlation of a radio frequency signal strength measurement and a grid point in a signal strength database or radio map, the signal strength database or radio map being built using a signal strength fingerprint algorithm that includes recording grid positions and signal strength measurements; and a data structure entry for each grid point being based at least partly on an identification number for each grid point, an estimated received information at a respective grid point, a physical location of the respective grid point, and received signal strength information from a respective transmission of an access point at the respective grid point,; and the signal strength fingerprint algorithm including: placing access points in the wireless local area network or other suitable network and recording their coordinates; taking signal strengths measurements in areas of interest in the wireless local area network or other suitable network; applying a linear regression method to estimate propagation channels; estimating propagation channels at each grid point; and processing the results to form the signal strength database or radio map when the computer program is run in a module of either a node, point or terminal, including an Access Point or other suitable grid point, in the wireless local area network or other suitable network.

24. A method comprising:

building a database using a signal strength fingerprint algorithm for use in providing an estimate of a mobile location of a wireless node, point or terminal in a wireless local area network or other suitable network arranged in a geographic location;

placing access points or other suitable grid points in the wireless local area network or other suitable network and recording their coordinates in the geographic location;

taking signal strengths measurements in areas of interest in the wireless local area network or other suitable network;

applying a linear regression method to estimate propagation channels;

estimating propagation channels at each access or other suitable grid point;

processing the results to form the signal strength database or radio map;

the signal strength database or radio map being built using the signal strength fingerprint algorithm that includes recording grid positions and signal strength measurements;

a data structure entry for each grid point being based at least partly on an identification number for each grid point, an estimated received information at a respective grid point, a physical location of the respective grid point, and received signal strength information from a respective transmission of an access point at the respective grid point; and the signal strength fingerprint algorithm including:

placing access points in the wireless local area network or other suitable network and recording their coordinates;

taking signal strengths measurements in areas of interest in the wireless local area network or other suitable network;

applying a linear regression method to estimate propagation channels;

estimating propagation channels at each grid point; and processing the results to form the signal strength database or radio map.

25. A method according to claim 24, wherein the data structure entry for each grid point is defined as $$R_i = \left\{ \begin{array}{c} P(x_i, y_i, z_i) \\ SS_{i,j} \end{array} \right\},$$

where i represents the identification number for each grid point, $R_i$ is the estimated received information at an i-th grid point, $P(x_i, y_i, z_i)$ is the physical location of the i-th grid point, and $SS_{i,j}$ is average received signal strengths from a j-th transmission of the access point at the i-th grid point.

26. A method according to claim 24, wherein the estimate is based on a correlation of a radio frequency signal strength measurement and a grid point in a signal strength database or radio map.

* * * * *

UNITED STATES PATENT AND TRADEMARK OFFICE
CERTIFICATE OF CORRECTION

PATENT NO. : 7,664,511 B2
APPLICATION NO. : 11/302311
DATED : February 16, 2010
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO.        : 7,664,511 B2
APPLICATION NO.   : 11/302311
DATED             : February 16, 2010
INVENTOR(S)       : Shu-Shaw Wang et al.

It is certified that error appears in the above-identified patent and that said Letters Patent is hereby corrected as shown below:

In column 13 at line 32 (claim 4, line 10), after "of" please insert --the--.

Signed and Sealed this
Twenty-second Day of March, 2011

David J. Kappos
*Director of the United States Patent and Trademark Office*